United States Patent Office 3,650,993
Patented Mar. 21, 1972

3,650,993
CRUSH-BEFORE-FINAL CURING PROCESS FOR MAKING DENSIFIED POLYURETHANE FOAM UTILIZING A VOLATILE ORGANIC FOAMING AGENT
Natale C. Zocco, East Haven, and Stanley I. Cohen, Orange, Conn., assignors to Olin Corporation, New Haven, Conn.
No Drawing. Continuation-in-part of application Ser. No. 780,247, Nov. 29, 1968. This application Apr. 6, 1970, Ser. No. 26,058
Int. Cl. B29d 27/04; C08g 22/04, 53/10
U.S. Cl. 260—2.5 BD                           19 Claims

ABSTRACT OF THE DISCLOSURE

An improved process for preparing flexible, densified polyurethane foam is disclosed which comprises allowing a polyurethane foam forming reaction mixture containing an organic foaming agent to rise, thereby forming a partially cured cellular material, and applying a compressive force to the partially cured cellular material to permanently reduce its volume. The organic foaming agent inhibits the formation of outer layers of undensified polyurethane foam integral with the densified polyurethane foam. The resulting flexible, densified polyurethane foam is particularly useful for such applications as cushioning and rug padding.

This application is a continuation-in-part of co-pending U.S. application Ser. No. 780,247, filed Nov. 29, 1968, now Pat. 3,506,600, and abandoned U.S. applications Ser. No. 708,524, filed Feb. 27, 1968, Ser. No. 661,756, filed Aug. 4, 1967, and Ser. No. 573,189, filed Aug. 18, 1966.

This invention relates to an improved process for making flexible, densified polyurethane foam.

There is a great need at the present time for flexible synthetic materials useful as backing for floor coverings such as rugs and plastic tile, and for use as padding, cushions, mattresses and the like.

The preparation of polyurethane elastomers has been known for many years. U.S. Pat. 2,866,774 discloses a technique for preparing polyurethane rubbers by reacting a polyether glycol of at least 600 molecular weight with an organic polyisocyanate. Although this type of polyurethane elastomer is somewhat flexible, the density is generally greater than about 40 pounds per cubic foot and control of density is not easily obtained during processing. In addition, elastomers of this type generally must be prepared by batch-wise casting or molding rather than on a continuous basis.

Polyurethane foams meet the flexibility and cost requirements, but they do not meet the density, resiliency and durability requirements which make them suitable for such uses as backing for floor covering materials and the like. Attempts have been made to increase the density of flexible polyurethane foams, but the techniques employed and the results obtained have been unattractive for various reasons.

Thus, U.S. Pat. 3,298,976 discloses that flexible polyurethane foams having densities from about 3.0 to 4.2 pounds per cubic foot can be prepared by incorporating particles of barytes in the polyurethane forming reaction mixture. However, in addition to requiring an added ingredient, such polyurethane foams are unsuitable in applications where denser, flexible polyurethane foams are desired.

Polyurethane foams having a density of from about 25 to about 50 pounds per cubic foot have been made by a critical molding technique as described in U.S. Pat. 3,125,617. While these foams may be suitable for some applications, they do not have the properties necessary for such uses as rug padding.

It is also known that crushing polyurethane foams without a long curing period causes permanent densification of the center portion of the foam, rendering the entire piece unusable. This undesirable effect is reported in Mobay Chemical Company Technical Information Bulletin No. 38–F14, dated Nov. 25, 1959. U.S. Pats. 3,060,-137 and 3,012,283 also disclose certain crushing techniques for polyurethane foams.

Now it has been found that flexible densified polyurethane foams can be prepared by placing a polyurethane foam forming reaction mixture containing an organic foaming agent in a reaction zone and allowing it to rise, thereby forming a partially cured cellular material, maintaining the partially cured cellular material for a critical period of time at a critical environmental temperature, and applying a compressive force to the partially cured cellular material to reduce its volume by a specified amount. The organic foaming agent inhibits the formation of undensified outer layers of foam integral with the densified foam so that these undensified layers are either eliminated or their thicknesses are reduced. The compressive force is then removed and curing of the compressed cellular material is completed. When the duration of the compression is extended and the thickness of the polyurethane foam being compressed is relatively small, it is possible that the polyurethane foam will be substantially cured for handling purposes by the time the compressive force is removed. Thus it will be recognized by those skilled in the art that such substantial curing can be effected prior to, simultaneously with, or subsequent to the removal of the compressive force; and that any one of these combinations is encompassed by the procedural step referred to in the specification and claims herein as "removing the compressive force and completing the cure of the compressed cellular material."

It may take several days for the foam to become fully cured under ordinary conditions. Accordingly, while it is within the contemplation of the invention to fully cure the foam while it is under the pressure of the compressive force, it is more convenient, from a practical standpoint, to remove the compressive force before fully curing the foam.

When partially cured cellular polyurethane is compressed in the absence of an organic foaming agent, densification begins around the middle of the partially cured cellular material, and a densified layer of foam is obtained with at least one outer layer of undensified foam integral therewith. If these undensified layers are not desired, they usually have to be trimmed off.

It has now been discovered that by including an organic foaming agent in the polyurethane foam forming reaction mixture, in the proportions defined below, the formation of undensified outer layers can be hindered or eliminated. Thus, waste, with respect to such layers which may have to be trimmed off, is minimized; and in some instances the entire trimming step is obviated. The flexible densified foams prepared according to the process of this invention are uniform in appearance, rendering them suitable for immediate use in various applications. They are characterized by a relatively high degree of wear resistance, and they have numerous commercial applications, such as rug padding and cushioning.

The flexible, densified polyurethane foams prepared according to the process of the invention can have a wide range of densities. However, it is preferred to prepare foams having densities ranging from about 1.5 to about 15, and more preferably from about 1.5 to about 10, pounds per cubic foot. Such foams are obtained by the process of the invention using a polyurethane foam forming reaction having a free rise density ranging from about 0.8 to about 4.0 pounds per cubic foot. By the term "free rise density," in the claims and specification herein, is meant the density a polyurethane foam would have if the foam forming reaction mixture were allowed to rise and cure without the application of a compressive force.

The flexible, densified polyurethane foams prepared according to the process of the invention are further characterized by having a Sac factor preferably between about 2.3 and about 10. Sac factor, as determined by ASTM–1564–64T, is the ratio of 65 percent Indentation Load Deflection to 25 percent Indentation Load Deflection. The Sac factors of the densified polyurethane foams of this invention are high, and thus these foams have little tendency to "bottom-out." The term "bottoming-out" is employed in the cushioning trade to describe a foam in which there is a sensation of sinking through and hitting the bottom when someone sits on it. Thus, it will be apparent that the densified, polyurethane foams provided by the process of this invention are highly useful for such applications as cushioning and rug padding.

In the process of this invention for preparing the densified polyurethane foams, either the so-called "one-shot method" or the "semi-prepolymer technique" ("quasi-prepolymer" technique) may be employed. Any combination of polyols, including polyether polyols and polyester polyols, organic polyisocyanate, foaming agent, catalyst and other reactants capable of forming a flexible urethane foam can be employed in carrying out the process of this invention, and the term "polyurethane foam forming reaction mixture" in the specification and claims herein is meant to include any such combination. Typical formulations are described in U.S. Pat. No. 3,072,582, issued Jan. 8, 1963 and Canadian Pat. No. 705,938, issued Mar. 16, 1965.

While, as indicated above, both polyether and polyester polyols can be employed in the practice of this invention, preferred embodiments utilize the polyether polyols in the preparation of the polyurethane foam forming reaction mixture. To further illustrate suitable formulations, the polyether polyols, useful for the preparation of the polyurethane foams, include oxyalkylated polyhydric alcohols having a molecular weight in the range between about 700 and about 10,000 and preferably between about 1,000 and 6,000. The hydroxyl number of the polyether polyol is generally less than about 250 and preferably in the range between about 25 and about 175. These oxyalkylated polyhydric alcohols are generally prepared by reacting in the presence of an alkaline catalyst, a polyhydric alcohol and an alkylene oxide such as ethylene oxide, propylene oxide, butylene oxide, amylene oxide, epichlorohydrin, and mixtures of these alkylene oxides, by either random addition or step-wise addition.

Polyhydric alcohols suitable for use in preparing the polyether polyol include ethylene glycol, pentaerythritol, methyl glucoside, propylene glycol, 2,3-butylene glycol, 1,3-butylene glycol, 1,5-pentane diol, 1,6-hexane diol, glycerol, trimethylolpropane, sorbitol, sucrose, mixtures thereof and the like. If desired, a portion of all of the polyhydric alcohol may be replaced with another compound having at least two reactive hydrogen atoms, such as alkyl amines, alkylene polyamines, cyclic amines, amides, and polycarboxylic acids. Suitable alkyl amines and alkylene polyamines include methylamine, ethylamine, propylamine, butylamine, hexylamine, ethylenediamine, 1,6-hexanediamine, diethylenetriamine, and the like. Also, such cyclic amines as piperazine, 2-methylpiperazine and 2,5-dimethylpiperazine can also be used. Amides, such as acetamide, succinamide and benzenesulfonamide, constitute a further class of such reactive hydrogen compounds. A still further class of such reactive hydrogen compounds is the di- and polycarboxylic acids, such as adipic acid, succinic acid, glutaric acid, aconitic acid, diglycollic acid, and the like. It will be recognized that the reactive hydrogen compound can be one containing different functional groups having reactive hydrogen atoms, such as citric acid, glycollic acid, ethanolamine, and the like. Aromatic polyamines such as toluene diamine can also be employed. Mixtures of oxyalkylated polyhydric alcohols are also suitable for use in the process of this invention.

The organic polyisocyanates used in the preparation of the polyurethane foams include toluene diisocyanate, such as the 4:1 mixture or the 65:35 mixture of the 2,4- and 2,6-isomers, ethylene diisocyanate, propylene diisocyanate, methylene - bis - 4 - phenyl isocyanate, 3,3'-bitoluene - 4,4' - diisocyanate, hexamethylene diisocyanate, naphthalene - 1,5 - diisocyanate, polyphenylene polymethylene isocyanate, mixtures thereof and the like. The amount of isocyanate employed in the process of this invention should be sufficient to provide at least about 0.7 NCO group per hydroxyl group present in the reaction system, which includes the polyol as well as any additive or foaming agent employed. An excess of isocyanate compound may be conveniently employed; however, this is generally undesirable due to the high cost of the isocyanate compounds. It is preferable, therefore, to employ sufficient isocyanate to provide no greater than about 1.25 NCO groups per hydroxyl group, and preferably between about 0.9 and about 1.15 NCO groups per hydroxyl group. The ratio of NCO to OH groups times 100 is referred to as the "index."

The polyurethane foams are prepared in the presence of a foaming agent, reaction catalyst, and preferably a small proportion of a conventional surfactant. In accordance with the teachings of this invention, a portion or all of the foaming agent used must be an organic foaming agent in order to minimize or eliminate the formation of outer undensified layers in the otherwise densified foam. A variety of well-known organic foaming agents can be used. These usually contain 1 to about 7 carbon atoms, and they include the halogenated hydrocarbons, lower molecular weight alkanes, alkenes, alkyl ethers and mixtures thereof. Illustrative foaming agents are methane, ethane, ethylene, propane, propylene, pentane, hexane, heptane, ethyl ether, diisopropyl ether, ethyl chloride, dichloromonofluoromethane, dichlorodifluoromethane, trichloromonofluoromethane, trifluoromonochloromethane, dichlorodifluoroethane, trichloromonofluoroethane, trichlorotrifluoroethane, dichlorotetrafluoroethane, and the like. The preferred organic foaming agents are the polyhalogenated hydrocarbons, particularly those containing at least one fluorine atom such as trifluoromonochloromethane.

These organic foaming agents can be employed in any amount which is sufficient to hinder the formation of outer undensified layers of foam. For example, from about 1 to about 50 parts, and preferably from about 5 to about 25 parts, per 100 parts by weight of polyol used in preparing the polyurethane foam forming reaction mixture, can be employed. It has generally been observed that using lower amounts (i.e., no more than about 15 parts per 100 parts of polyol) results in a reduction in the thickness, or elimination, of only the bottom undensified foam layer; whereas, the use of about 15 parts or more of organic foaming agent usually effects a reduction in, or an elimination of, both top and bottom layers of undensified foam.

As indicated above, the organic foaming agents, can be used alone or, as is preferred, in combination with an inorganic foaming agent. The preferred inorganic foaming agent is water which is generally used in a proportion ranging from about 1 to about 6 parts per 100 parts by weight of polyol.

The polyurethane foams are prepared in the presence of a catalytic amount of a reaction catalyst. The catalyst employed may be any of the catalysts known to be useful for this purpose, or mixtures thereof, including tertiary amines and metallic salts, particularly stannous salts. Typical tertiary amines include, but are not limited to, the following: N-methyl morpholine, N-hydroxyethyl morpholine, triethylene diamine, triethylamine and trimethylamine. Typical metallic salts include, for example, the salts of antimony, tin and iron, e.g., dibutyltin dilaurate, stannous octoate, and the like. Any catalytic proportion of catalysts may be employed. Preferably, a mixture of amine and metallic salt is employed as the catalyst. The catalyst or catalyst mixture, as the case may be, is usually employed in an amount ranging between about 0.05 and about 1.5, and preferably between about 0.075 and about 0.50 percent by weight of the polyol.

It is preferred in the preparation of the polyurethane foams to also employ minor amounts of a conventional surfactant in order to further improve the cell structure of the polyurethane foam. Typical of such surfactants are the silicone oils and soaps, and the siloxane-oxyalkylene block copolymers. U.S. Pat. 2,834,748 and T. H. Ferrigno, Rigid Plastic Foams (New York: Reinhold Publishing Corp., 1963), p. 38–42, disclose various surfactants which are useful for this purpose. Generally up to 2 parts by weight of the surfactant are employed per 100 parts of the polyol.

Various additives can be employed which serve to provide different properties, e.g., fillers such as barytes, clay, calcium sulfate, or ammonium phosphate may be added to lower cost and improve physical properties. Ingredients such as dyes may be added for color, and fibrous glass, asbestos, or synthetic fibers may be added for strength. In addition, plasticizers, deodorants and antioxidants may be added.

More in detail, in the practice of this invention a polyurethane foam forming reaction mixture comprising the above-described ingredients is fed to a suitable reaction zone such as by pouring into a suitable box or into a moving conveyor belt where reaction proceeds. The foaming reaction is exothermic, and auxiliary heat is not necessary to effect the reaction, although it can, of course, be employed. After the reactants have been admixed for a period of between about 0.1 and about 20 seconds, an emulsion or "cream" forms. As the temperature increases from the reaction, gas bubbles are generated, which cause the formation of an uncured cellular gel material which gradually increases in volume.

After generation of gas bubbles is completed, the rise of the uncured cellular gel material stops. The aforementioned critical process steps are employed at this point to provide densified foam compositions according to the teaching of this invention.

The first critical variable, which is referred to hereinafter as the "crush time," is the period of time which elapses between the completion of the rise of the uncured foam and the first application of pressure to the partially cured foam to effect crushing of the foam. In the process of this invention, this period of time can vary from 0 to about 10 minutes, and preferably from 0 to about 6 minutes. While flexible, densified polyurethane foams can be provided immediately after completion of the rise, practical operations allow at least about 6 seconds to elapse prior to crushing.

The second critical variable is the temperature of the ambience during the crush time. During this period it has been found that partially cured cellular material must be maintained within a critical environmental temperature range that is related to the crush time. Thus, where the crush time is between about 0 and about 2.5 minutes, temperatures between about 45° and about 400° F., and preferably between about 45° and about 200° F., are employed. Lower temperature ranges are utilized where the partially cured cellular material is maintained for a longer crush time. Thus, where the time interval is between about 2.5 and about 5 minutes, temperatures between about 45° and about 200° F., and preferably between about 45° and 100° F., are maintained; while temperatures between about 45° and 110° F., and preferably between about 45° and about 85° F., are employed where about 5 to about 10 minutes elapse before the application of a compressive force to the partially cured cellular material. Conventional means, such as ovens and cooling systems, are employed, if necessary, to provide the desired temperatures.

In commercial operations, it is particularly preferred to operate under environmental conditions, and thus temperatures from about 70° to about 110° F. are employed therein while maintaining the crush time within the broad range of 0 to 10 minutes.

At the end of the crush time, the partially cured polyurethane foam is compressed by any suitable means, such as rollers, platens, and the like.

The degree of deflection effected by the application of the compressive force is also critical to the practice of this invention. It is necessary to compress the partially cured cellular material to between about ⅔ and about ⅒ of its original thickness after rise in order to provide good densified foams. The desired degree of compression is achieved by adjusting the opening between the compressive means.

The duration of the crush and the temperature of the crushing means and the ambience during crushing are not critical to the practice of the invention described herein. However, it is apparent that commercial operations will avoid long crush durations for economic reasons.

After the partially cured polyurethane foam has been subjected to the pressure of the compressive means, the compressive force is removed and curing of the compressed material is completed. While curing can be accelerated by the application of heat, such treatment is not generally necessary since the foam will completely cure under ambient conditions. Thus, it will be recognized that completion of the cure can be effected with or without the use of elevated temperatures.

After removal of the compressive force and completion of the cure, the densified foam may recover a small portion of the difference between its initial height and the crushing gap, the degree of recovery depending upon the particular process variables. Of course, since the foam has been permanently densified it is apparent that it never completely regains its original dimensions.

If desired, the flexible, densified polyurethane foam obtained by the process of this invention can be prepared batch-wise. An illustrative batch process comprises feeding the foam forming ingredients into a conventional box, allowing the foam to complete the rise, permitting the crush time to elapse while maintaining an environmental temperature within the previously described critical range, removing the box from the partially cured cellular material, and then applying pressure thereto. Pressure is applied to the foam by means of platens or rollers to compress it to between about ⅔ and about ⅒ of its original volume and then removed to permit the compressed foam to complete the cure. Conveniently, the box, into which the foam forming reaction mixture is fed, may be of a selected dimension and configuration so that the final foam product can be used as is, or, if desired, after a trimming operation to remove the skin which usually forms on the foam surface. Thus densified foam mattresses, cushions and the like can be made using a batch process in accordance with the teachings of the invention.

However, it is preferred, particularly in commercial operations, to employ a continuous process for the preparation of the flexible, densified polyurethane foams of this invention. An exemplificative continuous process comprises admixing the foam forming ingredients containing the organic foaming agent in a suitable mixing head and feeding the resulting mixture to a moving conveyor having suitable side retaining means to contain the liquid reactants. The side retaining means are necessary until the foam gels sufficiently to support its own weight. A crushing station, comprising, for example, a pair of crushing rolls, is placed a certain distance downstream from the mixing head, so that the foam will be crushed at a specified crush time, the downstream distance being a function of the speed of the conveyor. A curing oven may be placed downstream from the crushing rolls to speed up the curing of the foam after it has been crushed; and, still farther downstream, a transverse cutter may be installed to cut the continuous flow of densified foam into sections of the desired length. If desired, means may also be provided downstream from the curing oven, for slicing or trimming off portions of the sides or the outer skin of foam, or for slicing the foam into longitudinal sections of the desired thickness. Here again, the foam, cut to the desired dimensions, can be used directly as a rug padding, mattress, cushion, and the like.

Various modifications of the aforesaid process may be employed without departing from the spirit of this invention. For example, the densified polyurethane foam of this invention may be formed into backing for floor covering such as rugs, tiles, carpets and the like by pouring the reaction mixture directly onto the back of a continuous moving length of floor covering, and compressing the resulting partially cured cellular material.

As indicated above, the flexible, densified polyurethane foams provided by the process of this invention have a wide variety of applications. Thus, for example, they are particularly valuable in the following areas: innersoles and liners for shoes; as backing, either as an integral part or a separate layer, for floor tiles made of rubber, asphalt, vinyl asbestos, vinyl, linoleum, chlorinated polyethylene elastomer, etc.; carpet backing and padding, either as an integral part or a separate layer, for carpets or rugs including wool, nylon, cotton, rayon, acrilan, polypropylene, and other types; mattresses; cushions; and furniture upholstery and construction.

Furthermore, they are useful for gasketing; padding applications of all types including floor pads for use in occupations requiring prolonged standing, table pads or table pad construction, key pads for musical (reed) instruments, and packing uses for delicate instruments; belting uses, particularly where chemical resistance is important; special filter media; weather-stripping; vibration insulators, including motor mounts; gymnastic equipment; hammers for piano construction; solid tires for fork-lifts, etc.; roofing systems, including use in laminates such as with chlorinated polyethylene; underlay for flooring materials; backing for floor sheeting materials as an integral part of the sheet; padding and case liners for delicate instruments; and industrial roll covering.

Other suitable applications for the flexible densified polyurethane foams provided by the process of this invention include elastomeric hammer heads; bottle cap liners; bulletin board construction; sealant gaskets, such as for drums, pails and other containers; wear-resistant stair treads and heavy-traffic-area floor covering; bumpers for loading docks and similar uses; blackboard erasers; squeegees for various applications; windshield wipers; door mats; skid-resistant, mar-resistant sheeting for underlining lamps, desk accessories, vases, appliances, etc.; pressure-sensitive tapes; phonograph turntable cushioning; automotive pedal covers; recoil pads for firearms; and automotive padding.

The following examples are presented to illustrate the invention more fully without any intention of being limited thereby. All parts and percentages are by weight unless otherwise specified.

EXAMPLES 1-3

A polyurethane foam forming reaction mixture was prepared from the following ingredients in the indicated proportions:

| Ingredients: | Parts by weight |
|---|---|
| Oxypropylated glycerin (molecular weight 3000) | 100 |
| Toluene diisocyanate (80% 2,4-, 20% 2,6-isomer; 105 index) | 49.8 |
| Stannous octoate | 0.25 |
| Triethylene diamine | 0.10 |
| Water | 4.0 |
| Silicone surfactant [1] (Dow Corning DC-190) | 1.5 |

[1] This surfactant is a block copolymer of a polydimethylsiloxane and a polyether resin.

The above reaction mixture was employed to prepare three foam samples, identified as E-1, E-2, and E-3, respectively. These foam samples were prepared from the above reaction mixture with 5, 10, and 15 parts, respectively, of trifluoromonochloromethane (hereafter referred to as R-11), added. The free-rise density of E-1 was about 1.35 p.c.f., of E-2 about 1.25 p.c.f., and of E-3 about 1.15 p.c.f. For purposes of comparison, a test foam sample, identified as C-1, was also prepared from the above reaction mixture as is, i.e., no R-11 added. This foam sample had a free rise density of about 1.5 pounds per cubic foot. In each case, the reaction mixture was poured into a square box having side dimensions of about 12 inches and a height of about 6 inches. After completion of the foaming, a crush time of 90 seconds, at an environmental temperature of about 75° C., was allowed to elapse. Each foam sample was then removed from the box and crushed between platens, on a hand press, set at an opening of about 1.5 inches. The crushed foam samples were allowed to cure and thereafter measured for the thicknesses of the densified middle layer and undensified outer layers, and for density and strength. The results are set forth in Table I below.

TABLE I

| Sample No. | E-1 | E-2 | E-3 | C-1 |
|---|---|---|---|---|
| Parts R-11 | 5 | 10 | 15 | 0 |
| Total thickness (in.) | 1.75 | 1.69 | 1.62 | 1.75 |
| Undensified thickness (in.): | | | | |
| Top layer | 0.31 | 0.31 | 0.25 | 0.19 |
| Bottom layer | 0 | 0 | 0 | 0.19 |
| Total | 0.31 | 0.31 | 0.25 | 0.38 |
| Densified layer thickness (in.) | 1.44 | 1.38 | 1.37 | 1.37 |
| Densified layer density (p.c.f.) | 5.54 | 5.67 | 5.79 | 5.41 |
| ASTM Sac factor | 5.79 | 5.93 | 5.84 | 5.66 |
| ASTM tensile strength (p.s.i.) | 53.2 | 56.1 | 64.1 | 58.4 |
| Tear strength | 5.99 | 6.47 | 6.60 | 5.24 |

The data in Table I show that the inclusion of 5 to 15 parts of trifluoromonochloromethane foaming agent in the polyurethane foam forming reaction mixture has the effect of eliminating the formation of an undensified bottom layer in densified foam prepared according to the method of the invention. This result is obtained without the other desirable properties of the densified foam being otherwise materially altered. In contrast, the data also shows that the exclusion of R-11 from test sample C-1 resulted in the formation of a bottom layer of undensified foam.

All of the foams of Examples 1-3 can be used directly in making cushions.

EXAMPLE 4

A polyurethane foam forming reaction mixture was prepared from the following ingredients in the indicated proportions:

| Ingredients: | Parts by weight |
|---|---|
| Oxypropylated glycerine (molecular weight 3000) | 100 |
| Toluene diisocyanate (80% 2,4-, 20% 2,6-isomer; 105 index) | 49.5 |
| Water | 4.0 |
| Silicone surfactant (Dow Corning DC-190) | 0.25 |
| Stannous octoate | 0.25 |
| Triethylene diamine | 0.30 |

A foam sample, identified as E-4, was prepared from the above mixture after the addition of 20 parts of R-11. For purposes of comparison, a test sample, C-4, was also prepared from the above mixture. In preparing this sample, however, no R-11 was added. The foam in E-4 had a free rise density of about 1.0, while the foam in C-4, due to the exclusion of R-11, had a free rise density of about 1.5 p.c.f. In each case, the reaction mixture was poured into a square box having side dimensions of about 12 inches. Upon completion of the foaming, the height of each sample was measured. After 3 minutes from pour time, the foams were crushed for 15 seconds between platens, on a hand press, set at an opening of about 1.7 inches. The foams were then allowed to cure and thereafter measured for thicknesses of the densified and undensified layers and for the density of the densified layers. The results are set forth in Table II below.

TABLE II

| Sample No. | E-4 | C-4 |
|---|---|---|
| Parts R-11 | 20 | 0 |
| Total height before crushing | 8.5 | 5.5 |
| Total height after crushing | 1.85 | 2.1 |
| Undensified thickness (in.): | | |
| Top layer | 0 | 0.10 |
| Bottom layer | 0 | 0.25 |
| Total | 0 | 0.35 |
| Densified layer thickness (in.) | 1.85 | 1.75 |
| Densified layer density (p.c.f.) | 3.30 | 3.60 |

As seen from the data in Table II, Example 4 shows that by including 20 parts of organic foaming agent R-11 in the polyurethane foam reaction mixture, the outer undensified layers are completely eliminated. This is again contrasted with C-4 in which no organic foaming agent was used and which had a total undensified foam thickness of 0.35 inch.

EXAMPLES 5–7

These examples illustrate the applicability of the invention to polyurethane foams prepared from toluene diisocyanate having varying NCO indices. For this purpose, three foam samples, identified as E-5, E-6, and E-7, respectively, were prepared using the basic procedure and ingredients of Example 4, with one modification: The toluene diisocyanate used had a varying index from 100 in the case of E-5, to 110 in the case of E-6, to 120 in the case of E-7.

For purposes of comparison three test foam samples, identified as C-5, C-6, and C-7, respectively, were prepared. Except for the exclusion of the R-11, C-5 corresponded to E-5, C-6 corresponded to E-6, and C-7 corresponded to E-7.

The crushed and cured samples were measured for thickness of the densified and undensified layers and the density of the densified layer. The results are provided in Table III below.

TABLE III

| Sample No. | E-5 | C-5 | E-6 | C-6 | E-7 | C-7 |
|---|---|---|---|---|---|---|
| CNO index | 100 | 100 | 110 | 110 | 120 | 120 |
| Parts R-11 | 20 | 0 | 20 | 0 | 20 | 0 |
| Total height before crushing (in.) | 8.0 | 5.5 | 9.0 | 6.5 | 9.0 | 7.0 |
| Total height after crushing (in.) | 1.9 | 2.2 | 1.9 | 2.2 | 1.9 | 2.2 |
| Undensified thickness (in.): | | | | | | |
| Top layer | 0 | 0.10 | 0 | 0.10 | 0 | 0 |
| Bottom layer | 0 | 0.20 | 0 | 0.30 | 0 | 0.35 |
| Total | 0 | 0.30 | 0 | 0.40 | 0 | 0.35 |
| Densified layer thickness (in.) | 1.90 | 1.90 | 1.90 | 1.80 | 1.90 | 1.85 |
| Densified layer density (p.c.f.) | 3.34 | 3.64 | 3.54 | 4.28 | 3.72 | 4.71 |

As seen from the above data, irrespective of the variation in the isocyanate index, whereas the foams containing no organic foaming agent had outer layers of undensified foam integral with the densified foam, the inclusion of 20 parts of trifluoromonochloromethane effected, in each case, a total elimination of these outer layers.

EXAMPLE 8

This example duplicates Example 4 except for the substitution of oxyethylated glycerin (molecular weight 3000) for the oxypropylated glycerin used in making the foam. Otherwise, the procedure and ingredients of Example 4 were used to prepare two foam samples, an illustrative sample identified as E-8 and containing 20 parts of R-11, and a test sample, for comparison purposes, identified as C-8 and containing no R-11. After being crushed and cured, the foams were again measured for the thicknesses of the densified layer and the undensified outer layers and for the density of the densified layer. The results are provided in Table IV below.

TABLE IV

| Sample No. | E-8 | C-8 |
|---|---|---|
| Parts R-11 | 15 | 0 |
| Total height before crushing (in.) | 7.5 | 5.0 |
| Total height after crushing (in.) | 2.0 | 2.1 |
| Undensified thickness (in.): | | |
| Top layer | 0 | 0.20 |
| Bottom layer | 0 | 0.30 |
| Total | 0 | 0.50 |
| Densified layer thickness (in.) | 2.0 | 1.6 |
| Densified layer density (p.c.f.) | 3.47 | 3.77 |

The data of Table IV again illustrates the advantage of using an organic foaming agent to eliminate the outer undensified foam layers which otherwise were formed in test sample C-8.

EXAMPLE 9

This example is provided to illustrate the applicability of the invention to polyurethane foam containing a filler. Again the same procedure and ingredients of Example 4 were used except that 40 parts of barytes were added. Two foam samples were prepared, an illustrative sample, identified as E-9 and containing 20 parts of R-11 and a test sample, C-9, containing no R-11. The samples, after crushing and curing, were measured for the thicknesses of the densified layers and the undensified outer layers. The results are set forth in Table V below.

TABLE V

| Sample No. | E-9 | C-9 |
|---|---|---|
| Parts R-11 | 20 | 0 |
| Total height before crushing (in.) | 8.5 | 5.5 |
| Total height after crushing (in.) | 2.0 | 2.2 |
| Undensified thickness (in.): | | |
| Top layer | 0 | 0.20 |
| Bottom layer | 0 | 0.20 |
| Total | 0 | 0.40 |
| Densified layer thickness (in.) | 2.0 | 1.8 |

It is seen from the data of Table V that the effect of using an organic foaming agent to reduce or eliminate the formation of outer undensified foam layers is equally applicable to polyurethane foams containing fillers.

What is claimed is:
1. A process for preparing a flexible densified polyurethane foam whereby the thickness of undensified polyurethane foam layers integral with said densified foam is reduced, which process comprises
   (a) placing a polyurethane foam forming reaction mixture containing a foaming agent in a reaction zone and allowing the mixture to rise, thereby forming a partially cure cellular material,
      (1) said foaming agent comprising at least one organic foaming agent having between 1 and about 7 carbon atoms and selected from the group consisting of
         (a) halogenated hydrocarbons
         (b) alkanes
         (c) alkenes and
         (d) alkyl ethers,

(2) the proportion of said organic foaming agent being sufficient to hinder the subsequent formation of an outer undensified layer of polyurethane foam integral with said densified polyurethane foam, (b) after the lapse of a period of time ranging from 0 to about 10 minutes following the completion of the rise, applying a sufficient compressive force to the partially cured cellular material to compress it to between about 2/3 and about 1/10 of its original volume, and (c) removing the compressive force and completing the cure of the compressed cellular material whereby a flexible, densified polyurethane foam is formed, with the proviso that where the period of time between completion of the rise and application of the compressive force is between 0 and about 2.5 minutes, the partially cured cellular material is maintained at an environmental temperature between about 45° and about 400° F. for said period;

where said period of time is between about 2.5 and about 5 minutes, the partially cured cellular material is maintained at an environmental temperature between about 45° and about 200° F. for said period; and where said period of time is between about 5 and about 10 minutes, the partially cured cellular material is maintained at an environmental temperature between about 45° and about 110° F. for said period.

2. The process of claim 1 wherein said period of time ranges from 0 to about 6 minutes and said environmental temperature ranges from about 45° to about 110° F.

3. The process of claim 2 wherein said polyurethane foam forming reaction mixture has a free rise density ranging from about 0.8 to about 4.0 pounds per cubic foot and said densified polyurethane foam has a density between about 1.5 and about 15 pounds per cubic foot.

4. The process of claim 3 wherein the proportion of said organic foaming agent ranges from about 1 to about 50 parts per 100 parts by weight of polyol employed in preparing said polyurethane foam forming reaction mixture.

5. The process of claim 4 wherein said organic foaming agent is selected from the group consisting of methane, ethane, ethylene, propane, propylene, pentane, hexane, heptane, ethyl ether, diisopropyl ether, ethyl chloride, dichloromonofluoromethane, dichlorodifluoromethane, trichloromonofluoromethane, trifluoromonochloromethane, dichlorodifluoroethane, trichloromonofluoroethane, trichlorotrifluoroethane, and dichlorotetrafluoroethane.

6. The process of claim 5 wherein said organic foaming agent is employed in a proportion ranging from about 5 to about 25 parts per 100 parts by weight of said polyol.

7. The process of claim 6 wherein said foaming agent is a mixture of said organic foaming agent and water.

8. The process of claim 7 wherein the proportion of the water is between about 1 and about 6 parts per 100 parts by weight of said polyol.

9. The process of claim 8 wherein said densified polyurethane foam has a density between about 1.5 and about 10 pounds per cubic foot.

10. The process of claim 9 wherein said organic foaming agent is trifluoromonochloromethane.

11. The process of claim 9 wherein said organic foaming agent is dichlorodifluoromethane.

12. The process of claim 9 wherein said organic foaming agent is dichlorodifluoroethane.

13. The process of claim 9 wherein said organic foaming agent is trichlorotrifluoroethane.

14. The process of claim 9 wherein said organic foaming agent is dichlorotetrafluoroethane.

15. The process of claim 9 wherein said polyol employed in preparing said polyurethane foam forming reaction mixture is a polyether polyol.

16. The process of claim 15 wherein said polyether polyol is an oxyalkylated polyhydric alcohol having a molecular weight ranging from about 700 to about 10,000.

17. The process of claim 16 wherein said polyether polyol is oxypropylated glycerin.

18. The process of claim 17 wherein the organic isocyanate employed in preparing said polyurethane foam forming reaction mixture is toluene diisocyanate.

19. The process of claim 18 wherein said organic foaming agent is trifluoromonochloromethane.

References Cited
UNITED STATES PATENTS

| | | | |
|---|---|---|---|
| 3,006,033 | 10/1961 | Knox | 264—54 X |
| 3,012,283 | 12/1961 | Foster | 264—321 X |
| 3,125,617 | 3/1964 | Hoppe | 264—54 |
| 3,246,059 | 4/1966 | Moroni et al. | 264—54 X |
| 3,442,411 | 5/1969 | Mahoney | 264—54 X |
| 3,056,168 | 10/1962 | Terry | 264—54 X |
| 3,506,600 | 4/1970 | Zocco et al. | 260—2.5 BD |
| 3,577,519 | 5/1971 | Gambardella | 161—190 X |

PHILIP E. ANDERSON, Primary Examiner

U.S. Cl. X.R.

161—160, 161, 190; 260—2.5 AF, 2.5 AZ; 264—48, 53, 54, 321, DIG 13, DIG 14